United States Patent [19]

Chan

[11] 4,377,181
[45] Mar. 22, 1983

[54] HIGH TEMPERATURE DUAL BUTTERFLY VALVE

[75] Inventor: John C. H. Chan, Houston, Tex.

[73] Assignee: Houston Systems Manufacturing Co., Inc., Houston, Tex.

[21] Appl. No.: 268,825

[22] Filed: Jun. 1, 1981

[51] Int. Cl.³ ........................... F16K 1/20; F16K 1/46
[52] U.S. Cl. ..................................... 137/584; 137/601; 251/306; 251/360
[58] Field of Search ...................... 137/583, 584, 512.1, 137/601, 329.01; 251/306, 307, 360

[56] References Cited

U.S. PATENT DOCUMENTS

| 1,464,244 | 8/1923 | Drake | 137/583 X |
| 1,801,361 | 4/1931 | Moore | 137/584 |
| 3,048,363 | 8/1962 | Garrigan | 251/307 |
| 3,533,438 | 10/1970 | Smith | 137/601 X |
| 4,105,040 | 8/1978 | Chester | 251/306 X |
| 4,266,753 | 5/1981 | Okada | 251/306 X |

FOREIGN PATENT DOCUMENTS

942277  2/1974  Canada ................................. 251/306

Primary Examiner—Robert G. Nilson
Attorney, Agent, or Firm—John D. Watts

[57] ABSTRACT

A large, high temperature, cost-effective butterfly valve with provisions for simple internal inspection and repair through a transverse access opening that is substantially smaller than the valve seat opening and which is repairable without necessitating removal of the valve body from the pipeline. A plurality of closure members that span the width of the valve seat opening are positionable in compact manner for removal through the small transverse access opening. A substantially annular seat is defined within the valve by a plurality of seat segments that are disposed in supporting and supported slip joint relation, thus permitting substantial radial expansion and contraction of the valve body without subjecting the valve seat structure to circumferential stresses.

25 Claims, 9 Drawing Figures

HIGH TEMPERATURE DUAL BUTTERFLY VALVE

FIELD OF THE INVENTION

This invention relates generally to large-sized butterfly valve structures that may be employed to control the flow of processing fluid in upstanding processing vessels or columns as well as flow systems of other character. More particularly, the invention relates to a butterfly valve structure incorporating a pair of cooperative closure elements that are simply and efficiently removable from the valve body without necessitating removal of the valve body from the processing vessel or flow system to which it is connected. Even more specifically, the present invention is related to a butterfly valve mechanism having an annular seat structure that is capable of maintaining an effective seal and accommodating substantial radial expansion and contraction of the valve body due to temperature and pressure conditions without subjecting the valve seat structure to circumferential stresses.

BACKGROUND OF THE INVENTION

When vertically oriented processing columns or vessels are provided with internal valve control, the valves are quite large and cumbersome to handle. Under circumstances where valve repair is required, the processing vessel must be taken out of service for an extended period and at least partially disassembled so that the valve can be removed and repaired or replaced. As a further disadvantage, the valve or valves may be positioned in the upper portion of an upstanding processing vessel and therefore may be located at a substantially elevated position above the support base of the vessel. It is generally necessary to employ a special portable crane mechanism to assist in removing and replacing the valve and for removing and replacing any other structure that must be removed to facilitate removal of the valve. Obviously, any requirement for special equipment such as cranes and any procedure that requires partial disassembly of a processing vessel and renders the processing vessel unserviceable for an extended period is of extremely expensive nature and is detrimental to commercial production of the vessel. It is desirable, therefore, to provide a valve mechanism that may be simply and efficiently repaired without any requirement for disassembling the process vessel or effecting complete removal of the valve to facilitate the repair procedure.

Where butterfly valves and other valves having annular seats are provided for service conditions involving a wide variation of heat and especially where very large valves are subjected to high temperature service, such as when used in processing vessels, fixed valve seat structures of such valves can become damaged any fractured by differential stresses that occur as the valve bodies expand and contract responsive to thermal variations. Under condtions where large valve bodies are composed of relatively thin material and have internal structural means defining an annular seat, it is quite possible that the internal stresses that are induced into the valve body by heat induced expansion or contraction of the differing masses that comprise the valve body may cause the valve body to fail. Large internal masses defined by typical annular valve seats become heated much more slowly as compared to relatively thin valve bodies and tend to expand and contract at different rates as compared to the valve body walls. When this occurs, the material at the juncture between the valve body walls and seat mass portion of the valve body structure can become excessively stressed, resulting in failure of the valve body. It is desirable, therefore, to provide means for ensuring against the development of internal stresses in the vicinity of the valve seat responsive to the temperature variations to which the valve might be subjected.

In most cases where butterfly valves are concerned, the valve closure element is a single integral disc element that is positioned in transverse relation to the flow path of the valve in a closed position thereof and is positioned in substantially parallel relation to the flow path in its open position. Peripheral sealing is typically accomplished by engagement at the external periphery of the disc element with resilient sealing members. Where high temperature valve service is expected, typical elastomeric valve seat members are not capable of functioning for extended periods of time if at all due to the adverse effects of the high temperature involved.

Butterfly valves are not widely accepted in high temperature service because of the difficulty in obtaining proper sealing while at the same time providing a valve mechanism that is effectively responsive under the adverse conditions of high temperature service. In most cases it is necessary to choose valves other than butterfly valves for high temperature service and thereby lose the efficiency that is typically a primary purpose in choosing butterfly valves for controlling the flow of fluids. The typical metal-to-metal sealing that is frequently desirable in high temperature service conditions is not ordinarily attainable in conventional butterfly valve mechanisms and, therefore, users are typically restricted to other kinds of valves when high temperature service is expected. Examples of a dual closure type butterfly valve that is capable of high temperature service are evidenced by U.S. Pat. Nos. 3,533,438 and 3,384,112 of Smith. Other similar valves are shown in U.S. Pat. Nos. 3,241,568 of Mayo, Jr., 3,179,164 of Heller et al and 4,038,734 of Goldman.

Especially under conditions where valves are to be utilized in high temperature service, it is necessary to repair the valves on more frequent occasions as compared to service conditions where normal operating temperatures are encountered. It is also desirable under such conditions to provide valves that are capable of being repaired while in place in the processing vessel in order that it is not necessary to disassemble the vessel in order to service the valve. It is desirable to repair the valves without unnecessary delay in order that the processing vessel can be placed back in service with minimal down time. In view of the fact that most butterfly valves must be completely removed from the processing vessel for repair or replacement, butterfly valves typically present obstacles to accomplishing repair with minimum down time. It is desirable, therefore, to provide a valve mechanism having the operational capability of a butterfly valve and yet being capable of repair without necessitating removal of the valve body from the processing vessel. Accordingly, it is a primary feature of the present invention to provide a novel butterfly valve mechanism having dual closure elements which is capable of being repaired without removal of the valve body from the line.

It is also a feature of the present invention to provide a dual closure type butterfly valve that is readily adapted to service conditions where wide variations in temperature are to be expected.

It is another feature of this invention to provide a novel dual closure type butterfly valve mechanism incorporating a seat assembly that is not subjected to circumferential stressing as the valve body is subjected to considerable expansion and contraction due to heat fluctuation during service conditions.

It is another important feature of this invention to provide a novel dual closure type butterfly valve mechanism for process vessels and the like wherein an offset access opening is defined by the valve body and the closure and closure support structures of the valve are capable of being positioned for effective removal through the access opening, thereby enabling a valve mechanism to be effectively serviced without removal of the valve body from the process vessel and thereby promoting minimal down time for valve repair.

It is an even further feature of this invention to provide a novel dual closure type butterfly valve mechanism wherein minimal turbulence is created in the fluid flowing through the full valve while the valve mechanism is being maintained in the open position thereof and wherein minimum hydraulic losses occur in the flowing fluid responsive to differential pressure across the open valve mechanism.

Other and further objects, advantages and features of this invention will become obvious to one skilled in the art upon an understanding of the illustrative embodiment about to be described and various advantages, not referred to herein, will occur to one skilled in the art upon employment of the invention in practice.

SUMMARY OF THE INVENTION

The present invention is directed to the provision of a butterfly valve mechanism that is effectively adaptable for the provision of large valves such as valves for process vessels and which are particularly designed for high temperature service conditions. The valve mechanism incorporates a valve body within which is positioned a pair of partially circular butterfly valve discs that are pivotally connected along a substantially straight side portion thereof to a centrally located fixed transverse structural support that is centered with respect to a center line of the valve. The valve body is formed to define an offset transverse access opening of smaller dimension as compared to the full diameter defined by the valve closure elements in the closed position thereof. The valve elements are positionable such that they may be simply and efficiently removed individually or in assembly with a structural support member from the valve body through the offset access opening, thus allowing repair of the valve while the valve body is allowed to remain in assembly with the vessel.

The valve mechanism also incorporates a plurality of seat segments that are retained within an annular seat groove that is defined by upstream and downstream seat abutments that are secured within the valve body. The seat segments are each adapted to accomplish an overlapping and interlocking sealed relation with one another and provide a slip joint between each adjoined seat segment that allows for substantial circumferential expansion and contraction of the valve body without placing any adverse stresses on the seat structure. The seat segments are each retained in assembly within the valve body by single bolts that extend through apertures formed in the valve body and are threadedly received by respective seat segments. The seat segments are also simply and efficiently disassembled from within the valve body and removed through the offset access opening during inplace repair of the valve.

BRIEF DESCRIPTION OF THE DRAWINGS

In order that the manner in which the above-recited advantages and features of this invention are attained and can be understood in detail, more particular description of the invention, briefly summarized above, may be had by reference to the specific embodiment thereof that is illustrated in the appended drawings, which drawings form a part of this specification. It is to be understood, however, that the appended drawings illustrate only a typical embodiment of this invention and, therefore, are not to be considered limiting of its scope, for the invention may admit to other equally effective embodiments.

IN THE DRAWINGS

DETAILED DESCRIPTION OF PREFERRED EMBODIMENT

Figure 1:
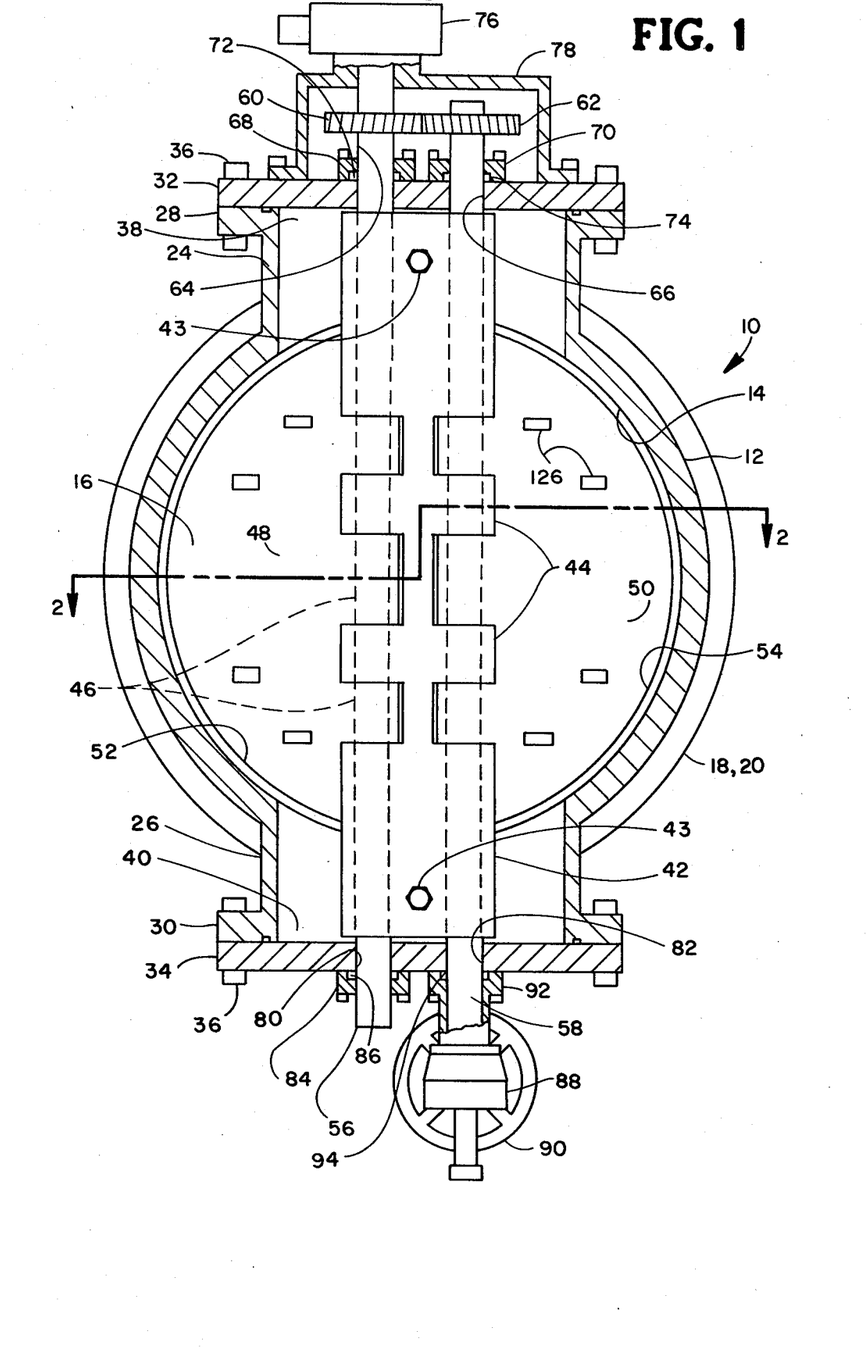
FIG. 1 is a sectional view of a dual closure type butterfly valve mechanism constructed in accordance with the teachings of the present invention and being provided for both power and manual valve operation.
Figure 2:
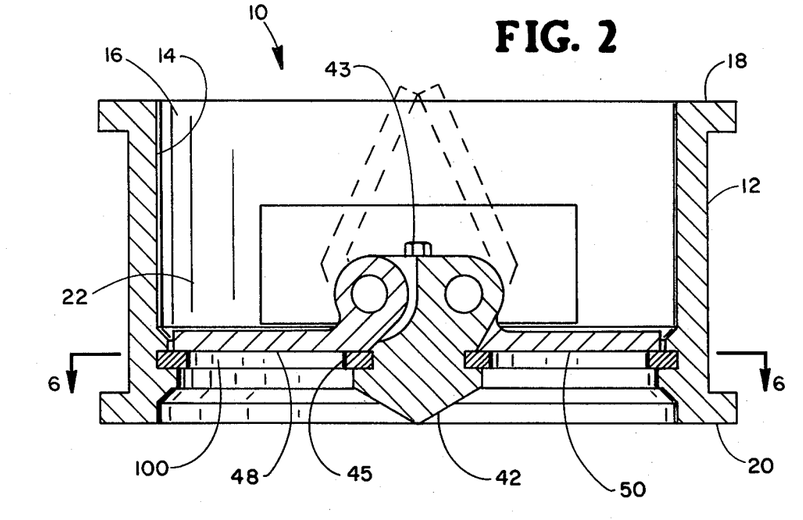
FIG. 2 is a sectional view taken along line 2—2 of FIG. 1, showing the butterfly valve closure elements in the closed position in full line and in fully open position in broken line.

Referring now to the drawings and first to FIGS. 1 and 2, there is provided a dual closure type butterfly valve mechanism generally at 10 that incorporates a valve body 12 of generally cylindrical configuration defining a generally cylindrical internal wall surface 14 forming the flow passage 16 of the valve. The extremities of the valve body 12 are defined connection flange structures 18 and 20 that enable the valve body to be suitably interconnected with upper and lower sections of a process vessel through which process fluid flows under control of the valve mechanism. Although for purposes of simplicity and to facilitate ready understanding, the invention is described particularly in its use within vertically oriented process vessels, such description is not intended to limit the scope of the invention in any manner whatever. The invention may be utilized in any desired position for controlling the flow of fluids in flow lines, horizontally positioned process vessels etc. without departing from the spirit or scope hereof. As shown, the flanges 18 and 20 are provided typically for bolted connection of the valve body to the process vessel. It is intended, however, that the valve body be connectable to the vessel or flow line by any suitable connection means such as by bolting, welding, clamping, for example.

In order to provide for control of fluid flowing through the valve, the valve mechanism is provided with a seat assembly which is illustrated generally at 22 and which is described in greater detail in connection with FIGS. 4-7 to be discussed hereinbelow.

It is desirable to provide a valve mechanism for process vessels and the like which may be selectively actuated by power energized valve actuator means or by manual valve actuator means. It is also desirable to provide a valve mechanism wherein the valve elements, seat assemblies and support members may be simply and efficiently removed from the valve body structure without necessitating removal of the valve body from the process vessel. In accordance with the present invention, these features are effectively provided by a valve mechanism of the form illustrated in the various figures of the drawings. The valve body structure 12 is formed to define opposed body projections 24 and 26 having bonnet flanges 28 and 30 provided at the outer extremities thereof. A pair of bonnet closure plates 32 and 34 are secured to the respective bonnet flanges 28 and 30 by means of bolts or by any other suitable form of connection. The bonnet closure plates 32 and 34 define closures for opposed access openings 38 and 40 that are defined by the opposed body projections 24 and 26.

The valve body structure 12 also provides a transverse valve support element 42 which is interconnected at each extremity thereof to the valve body structure. The valve support element 42 may be formed integrally with the valve body, if desired, or it may be structurally interconnected with the valve body structure in any suitable manner as by bolts 43, that enables the valve support element to be positioned in fixed relation transversely of the flow passage 16. Valve support element 42 may be formed to receive straight seat segments as at 45 which are secured to element 42 by any removable suitable means, such that segments 45 may be replaced as necessary. Seat segment 45 may be provided with an expansion joint as later described for curved seat segments 100. The valve support element 42 defines a plurality of transversely extending pivot projections 44 that are disposed in spaced relation and are adapted for interfitting relation with a plurality of mating pivot projections 46 that are defined by a pair of valve plate elements 48 and 50. The valve plate elements 48 and 50 are of partially circular configuration and are adapted to interfit with the valve support element 42 in such manner that the outer peripheral surface portions 52 and 54 thereof are positionable for sealing contact with seat segments 45 and 100 when in the closed position shown in FIGS. 1 and 2. As shown in FIG. 2, the valve elements 48 and 50 are pivotal to the open position as shown in broken line in order to allow flow of fluid through the valve and through the process vessel to which the valve is interconnected. Valve plate elements 48 and 50 are also positionable at any desired intermediate position between the fully open and fully closed positions illustrated in FIG. 2 in the event that the flow of fluid should be restricted in accordance with the process being accomplished.

A pair of valve actuating stems 56 and 58 are adapted to be extended through appropriate bores formed in the respective transverse pivot projections 44 and 46 of the valve support element and valve plates. Each of the valve stems 56 and 58 is interconnected in non-rotatable relation with the transverse pivot projections 46 of the valve elements and are disposed in rotatable relation with the transverse pivot projections 44 of the valve support element. Upon rotation of the valve stems 56 and 58, pivotal movement of the valve plates 48 and 50 will occur within the flow passage 16, thus moving the valve plates toward the open or closing positions thereof, as desired.

It is desirable to provide cooperative simultaneous rotation of the valve actuator stems or shafts 56 and 58 and this feature is efficiently accomplished by providing each of the shafts with respective gear elements 60 and 62 that are maintained in interengaged relation. As the primary valve actuator shaft 56 is rotated, the drive gear 60 imparts driving counterrotation to the driven gear 62, thereby causing the shaft 58 to counterrotate in order that the valve plate 50 is moved in the proper manner toward its open or closed position.

The valve operator stems 56 and 58 extend through apertures 64 and 66 that are formed in the bonnet closure plate 32 and are supported for rotation relative to the closure plate structure by means of appropriate bearing elements 68 and 70. The bearing elements may also function as retainer elements for a pair of suitable shaft seals 72 and 74 that establish a sealed relationship between the closure plate and the respective valve operator stems 56 and 58 so as to seal against fluid within the valve body and against heat that may damage gears 60 and 62. For the purpose of providing powered actuation of the valve mechanism, a power actuator 76 is secured to the bonnet closure plate 32 by means of an actuator connection system 78 and receives the outer extremity of the stem 56 in driving relation therewith. Connection system 78 may be extended, finned and/or ventilated so as to dissipate heat conducted through plate 32 so as to protect the gears and actuator from heat damage. The valve actuator 76 may be of any suitable character within the spirit and scope of the present invention, it only being necessary that the valve actuator be capable of imparting controlled driving rotation to the driven valve stem 56.

At the opposite side of the valve body structure, the bonnet closure plate 34 is formed to define a pair of shaft openings 80 and 82 through which the opposite extremities of the stems 56 and 58 extend. A bearing and retainer element 84 that is interconnected with the closure plate 34 functions to provide bearing support for the opposite extremity of the valve stem 56 and also serves as a retainer element for a shaft seal 86 which rotatably seals the shaft with respect to the closure plate. To provide for manual actuation of the valve mechanism, a manual valve actuator 88 of any suitable character is interconnected with the bonnet closure plate 34 by bolted connection, as shown, or by any other suitable means of connection. The manual actuator 88 receives the opposite extremity of the valve stem 58 in driving relation therewith, enabling stem 58 to be rotated manually simply by accomplishing rotation of the actuator hand wheel 90. The base portion 92 of the valve actuator mechanism also functions as a retainer element for the purpose of retaining a shaft seal 94 that seals the shaft 58 with respect to the bonnet closure plate.

Either of the valve actuators are controllable so as to position the butterfly valve disc elements at any suitable intermediate position in the event it is desired to achieve a throttling effect for fluid being controlled by the valve mechanism. The valve actuator mechanism is capable of positioning the butterfly disc elements at any suitable intermediate position and for maintaining such positioning for extended periods of time.

Figure 4:
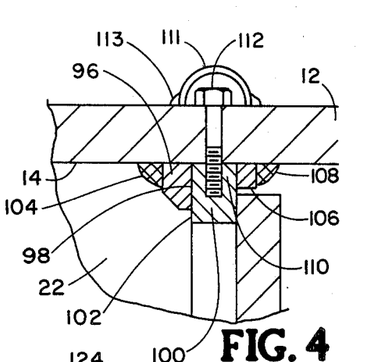
FIG. 4 is an enlarged fragmentary sectional view of the valve body mechanism of FIG. 2, illustrating the removable seat segment structure thereof in detail.
Figure 5:
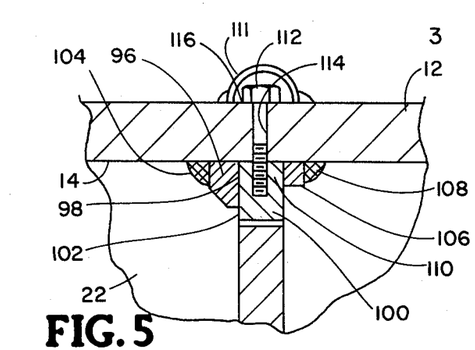
FIG. 5 is an enlarged fragmentary sectional view illustrating a seat assembly representing a modified embodiment thereof.

Referring now particularly to FIGS. 4 and 5, the cylindrical portion of the valve body structure 12 retains a seat assembly illustrated generally at 22, comprising seat segments 100 which are readily removable from the valve mechanism as desired. As shown in FIG. 4, a first abutment ring is provided as shown at 96 which defines a substantially circular planar abutment surface 98 against which may be seated a plurality of seat segments 100. The annular abutment surface 98 is of sufficient dimension to support substantially the entire downstream abutment surface portion 102 of the seat segments 100 and is fixed with respect to the internal cylindrical surface portion 14 of the body structure 12 by means of an annular weld 104. A second abutment ring 106 of the same external dimension as compared to abutment ring 96, but being of larger internal dimension as compared thereto, is secured to the inner surface 14 of the valve body 12 by means of an annular weld 108 upstream of ring 96. Abutment ring 106 cooperates with the downstream abutment ring 96 so as to define an annular seat groove 110 within which the seat segments 100 are received. The seat segments are retained within the annular seat groove 110 by means of a plurality of bolts 112 that extend through bolt apertures 114 and are threadedly received by the respective seat segments. A fluid sealing element 116 may be positioned between the bolt 112 and the valve body 12, thus preventing any leakage of fluid from the valve chamber especially during hydrostatic testing thereof. The sealing element 116 may be composed of any suitable heat resistant sealing material within the spirit and scope of this invention. After the valve assembly has been finally assembled and tested so as to make ready for service installation, caps 111 may be secured to body 12 and sealed around bolts 112 by means of welds 113 to form a primary seal against high temperature fluid that may pass through apertures 114.

Although the outer periphery of the butterfly valve disc segments may be positioned in close but non-contacting relation with the seat segments 100 as shown in FIG. 5 for services not requiring tighter sealing, the character of the disc/seat engagement illustrated in FIG. 4 may generally be considered more practical under circumstances where the valve mechanism is subjected to a wide range of temperature, thus causing considerable expansion and contraction of the butterfly valve disc structure and the seat assemblies. In FIG. 2 and FIG. 4, the sealing peripheries of the butterfly disc segments establishes abutting sealing engagement with the curved seat segments 100 and straight seat segments 43.

Figures 6, 7, 8, 9:
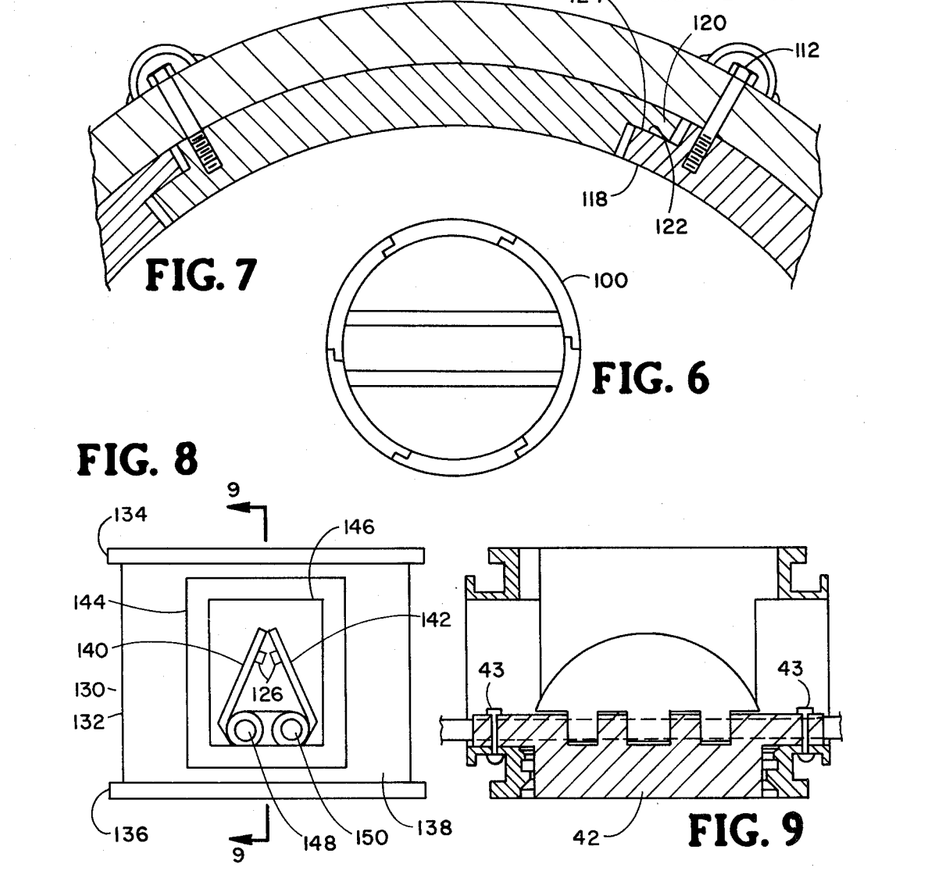
FIG. 6 is a sectional view of the valve seat segment structure taken along line 6—6 of FIG. 2.
FIG. 7 is an enlarged fragmentary view of one of the seat segments of FIG. 6.
FIG. 8 is a view of a butterfly valve representing a modified embodiment of this invention and illustrating installation and removal of valve disc plates in the open position thereof.
FIG. 9 is a sectional view of a butterfly valve taken along line 9—9 of FIG. 8.

Referring now to FIGS. 6 and 7, each of the seat segments 100 is formed to define a pair of opposed retainer flanges 118 and 120 with flanges 118 being disposed in spaced relation with the inner cylindrical surface 14 of the valve body and with retainer flanges 120 being positionable in abutment with cylindrical surface 14. The retainer flange 118 is formed to define a radially outwardly facing sealing surface 122. Cooperating retainer flange 120 is formed to define a radially inward facing sealing surface 124 which may also be of curved or partially cylindrical configuration. The retainer flanges 118 and 120 are dimensioned such that, with the seat segments forced into tight assembly with the inner surface 14 of the valve body by the respective bolts 112, the sealing surfaces 122 and 124 of the retainer flanges will be urged into tight fluid sealing engagement. As the valve body 12 is caused to expand and contract responsive to the application of heat thereto, during heating and cooling cycles, the opposed sealing surfaces 122 and 124 will be allowed to slip, while at the same time remaining in sealing engagement one with the other. The sealing segments 100, therefore, define slip joints that are capable of being maintained in sealing engagement during expansion and contraction of the valve body. Under such circumstances it is clear that the seat segments are not placed in any significant degree of circumferential stress and, therefore, are not subjected to the possibility of damage as the valve body expands and contracts responsive to heating and cooling.

It should also be borne in mind that only a single bolt is utilized for the purpose of securely connecting each of the valve seat segments into supporting and supported relation with other seat segments which facilitates removal and replacement of seat segments particularly under adverse field conditions. By positioning the bolts 112 relatively close to the supporting flange portions 118 of each of the segments, the supported flange portions 120 will be effectively supported and there will be no tendency for the seat segments to become disassembled due to lack of structural integrity.

Figure 3:
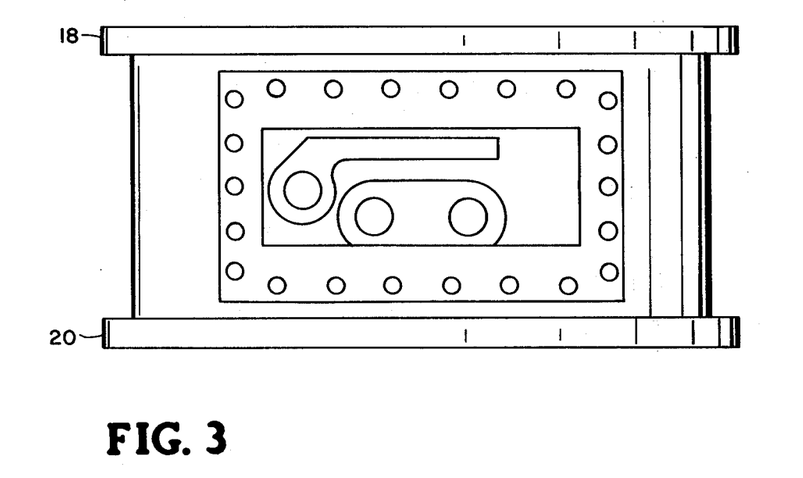
FIG. 3 is an elevation view of FIG. 1, illustrating the physical dimension of a longitudinally disposed access opening defined by the valve body and showing the position of a disassembled closure element for removal thereof through the access opening.

As mentioned above, it is desirable to provide the valve mechanism 10 with the facility for being repaired while the valve body is allowed to remain in interconnected relation within the structure of the process vessel or flow line. It may be desirable to remove seat segments 100 and 43 for replacement in the event that same become eroded or corroded to the extent that proper sealing ability thereof cannot be accomplished. It may also be desirable to remove the valve plate elements 48 and 50 for repair or replacement. As illustrated in FIG. 3, the opposed body projections and bonnet flanges are positioned in offset relation with respect to an axis of the valve extending transversely of the flow passage 16. And thus, the access openings 38 and 40 are also in offset relation with respect to such transverse axis. The body projections 24 and 26, however, are positioned so as to define noninterfering relation with the seat assembly 22 in order that the seat assembly may comprise circular configuration and not intersected by the respective access openings. The seat assembly 22 is also disposed in offset relation with respect to a transverse central axis of the valve body in order that the noninterfering relationship of the body projections and access openings may be established relative thereto. It should also be borne in mind that the opposed access openings 38 and 40 are of relatively narrow configuration being only sufficiently wide that desired valve members may be removed therethrough in disassembled or closed position and access may be gained to the various seat segments for the purpose of effecting removal and installation of the seat segments as well. The transverse valve support element 42 is positioned with respect to the access openings 38 and 40 such that the valve control stems or shafts 56 and 58 may be installed and removed through the access openings.

In the event servicing of the valve mechanism is required, the bonnet closure plates 32 and 34, together with the various actuator mechanisms and bearing assemblies are removed from the bonnet flange structures 28 and 30. In the event removal of one or both of the valve plates 48 and 50 only is desired, a suitable pair of valve support implements will be inserted through lifting eyes as at 126 to provide appropriate support for the plate. The respective valve operator shaft 56 or 58 is then extracted through one of the access openings, thus releasing the pivotal connection of the valve plate with the valve support element 42. After this has been accomplished, the valve plate is shifted to the position illustrated in FIG. 3 and is then extracted transversely through the access opening. The other valve plate element is removed in similar manner. The seat segments 100 and 45 may be removed from the valve body structure simply by removing cups 111 and bolts 112 thereby allowing the seat segments to be supported in unrestrained position within the vessel structure. The seat segments may be manually extracted and replaced with new seat segments and the bolts may be utilized to secure the new seat segments. The valve plate elements may be reinstalled or new plate elements installed by inserting an appropriate lifting mechanism through the lifting eyes 126 and inserting the valve plate through one of the access openings into the valve chamber or flow passage of the valve. After this has been accomplished, the valve plate is then shifted transversely and the respective pivot projections 46 thereof are brought into registry with pivot projections 44 of the valve support element 42. The valve actuator stem 56 or 58 is then inserted through the registering openings of the pivot projections, thus establishing a proper pivotal connection between the valve support element 42 and the valve plates. The opposite valve plate element is inserted into position and interconnected with the pivot projections of the valve support element in the same manner as described above.

Although the valve construction illustrated in FIG. 3 is shown with flange 18 defining the upper connection flange of the valve body structure, it should be borne in mind that the valve mechanism may be reversed and connection flange 20 will then define the upper flange. In such case, removal and installation of the valve plates 48 and 50 may be accomplished in an alternative manner. A transverse support structure in the form of a support plate such as a steel plate, for example, may be inserted through one of the access openings 38 and 40 and may be positioned with the opposite extremity thereof within the opposite access opening. This support plate will then provide adequate support for either of the valve plate elements 48 or 50 which may be disassembled from the valve support element 42 simply by extracting the appropriate valve stem 56 or 58. The valve plate element will then be lowered onto the temporary support plate and then may be extracted simply by sliding the valve plate element transversely along the support plate out of either one of the access opening 38 or 40. The opposite valve plate element 48 or 50 may then be removed in similar manner. Reinstallation of the valve plates may be accomplished simply by sliding respective ones of the valve plate element transversely and then raising the pivot projections 46 of the plate by means of jacks or any other suitable lifting implement. Upon establishing registry of the bored openings in the pivot projections 44 and 46, the respective valve stems 56 or 58 is then brought into assembly to establish the pivotal relationship between the valve plates and the valve support element.

Referring now to FIG. 8, a modified embodiment of the present invention is illustrated generally at 130 incorporating a valve body structure 132 having connection flanges 134 and 136. The valve body structure may be of the same general configuration as the valve body structure 12 of FIG. 3 and a seat assembly 138 may take any of the alternative forms set forth above. Valve disc plates 140 and 142 may be provided which are substantially identical with the structure of valve disc plates 48 and 50 of FIGS. 1–3.

In the valve structure of FIG. 8, a bonnet and bonnet flange structure may be provided as shown at 144 defining an access opening 146 through which both of the valve plate elements 140 and 142 are exposed in the open positions thereof. With the valve elements 140 and 142 positioned in the open positions thereof as shown, any suitable disc plate manipulating mechanism may be brought into assembled relation with one of the valve discs. After removal of the appropriate valve actuator shaft 148 or 150, the valve disc plates may be removed through the access opening 146.

It may be desirable to provide a butterfly valve mechanism in accordance with this invention that may be removed as an assembly. As shown in FIG. 9, support element 42 may be removed in assembly with valve plate elements 140 and 142 and in assembly with stems 148 and 150, by: securing plates 140 and 142 in open position per FIG. 8 as by wiring lugs 126 together; then removing bolts 43; placing a bar under the wire between lugs 126; lifting the bar so as to lift the assembly up and through opening 146. Reversal of this procedure will accomplish remounting or replacement of the assembly as a unit.

It is, therefore, apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

Having thus fully discussed my invention in detail, I claim:

1. A high temperature butterfly valve comprising:
   a valve body adapted to be connected into a flow system and being formed to define a flow passage generally coextensive with the flow way defined by said flow system, said valve body also defining an internal valve seat means within said flow passage and defining a transverse access opening in communication with said flow passage;
   shaft support means extending transversely of said flow passage and being immovably interconnected with said valve body;
   a pair of partial disc closure elements being positioned within said flow passage and defining sealing surface means adapted to establish sealing relationship with said valve seat means;

a pair of closure actuating shafts being positioned within said valve body and extending in transverse relation with said flow passage, each said disc closure elements being pivotally supported within said flow passage by respective ones of said closure support shafts;

said closure elements and said support shafts being removable from said flow passage transversely through said transverse access opening and facilitating repair of said valve while positioned in said flow line; and means for controlling pivotal positioning of said closure elements relative to said valve seat means.

2. A high temperature butterfly valve as recited in claim 1, wherein:

said seat means is at least partially defined by a plurality of removable seat segments; and means supporting said seat segments in assembly with said valve body.

3. A high temperature butterfly valve as recited in claim 2, wherein:

spaced abutment means is defined within said valve body defining an annular seat groove therebetween, said seat segments being positioned at least partially within said annular seat groove.

4. A high temperature butterfly valve as recited in claim 2, wherein:

a first annular abutment is defined within said valve body;

a second annular abutment is defined within said valve body on the upstream side of said first annular abutment and being in spaced relation with said first annular abutment and defining a seat groove therebetween; and said seat segments being at least partially received within said seat groove.

5. A high temperature butterfly valve as recited in claim 4, wherein:

said first annular abutment is of large dimension and defines a supporting surface supporting substantially the entire downstream surfaces of said seat segments; and said second annular abutment is of smaller dimension as compared to said first annular abutment and supports the radially outer portions of said seat segments and exposes the radially inner portions of said seat segments for contact by said closure elements.

6. A high temperature butterfly valve as recited in claim 5, wherein:

said first and second annular abutments are defined by rings having outer peripheral portions dimensioned for fitting relation with the inner surface of said valve body; and weld means secures said first and second abutment means in assembly with said valve body.

7. A high temperature butterfly valve as recited in claim 1, wherein:

said seat means is defined by a plurality of removable seat segments; and means establishing movable joints between each of said seat segments permitting circumferential expansion and contraction of said seat means relative to the valve body.

8. A high temperature butterfly valve as recited in claim 7, wherein said movable joint means comprises:

a first joint sealing portion at one extremity of said seat segment with said valve body, said first joint sealing portion defining an inwardly facing sealing surface; and a second joint sealing portion at the opposite extremity of said seat segment and being in spaced relation with said valve body, said second joint sealing portion defining an outwardly facing sealing surface adapted for sealing engagement with the inwardly facing sealing surface of an adjacent seat segment.

9. A high temperature butterfly valve as recited in claim 8, wherein:

said first and second joint sealing portions define a lapped joint; and retainer means secure said second joint sealing portions of each of said seat segments in relation with said valve body and said second joint sealing portions overlapping said first joint sealing portions and retaining the same positioned in sealing engagement with said valve body.

10. A high temperature butterfly valve as recited in claim 1, wherein:

said valve body is formed to define access opening means positioned on one side of said seat means, said access opening being of greater length than the width of one of said disc closure elements and being of sufficient width to permit positioning of a disassembled one of the disc closure elements in at least partially overlapped relation with the other disc closure element when assembled in pivotal relation within said valve body.

11. A high temperature butterfly valve as recited in claim 10, wherein:

said valve body is formed to define opposed access openings.

12. A high temperature butterfly valve as recited in claim 10, wherein:

said valve body is formed to define opposed access openings;

bonnet closure plate means is connected to said valve body to close said access openings;

said closure plate means receiving said closure actuating shafts in sealed rotatable relation therethrough; and valve operator means adapted to rotate said closure actuating shafts.

13. A dual closure butterfly valve for high temperature service, said butterfly valve comprising:

a valve body defining a generally cylindrical inner surface forming a generally cylindrical flow passage;

means defining a generally circular seat groove in said inner surface of said valve body;

a plurality of seat segments being removably positioned within said seat groove, said seat segments cooperating to define generally circular valve seat means, each having substantially sealed slip joint interconnection with adjacent seat segments and permitting circumferential expansion and contraction of said valve body while maintaining said seat segments substantially free of circumferential stresses;

closure support means extending transversely of said flow passage and being supported by said valve body;

a pair of closure elements being pivotally interconnected with said closure support means and defining sealing surface means adapted for sealing engagement with said seat segments in the closed position thereof, said closure elements being pivotally movable to an open position with said closure elements positioned in unrestricting relation to the flow of fluid through said flow passage; and actuating means being interconnected with said closure elements and adapted to induce selective opening and closing movement of said closure means.

14. A dual closure butterfly valve as recited in claim 13, wherein:

said valve body is formed to define a transverse access opening of smaller dimension as compared to the diameter defined by said closure elements in the closed position thereof; and said closure elements being removable from said valve body through said transverse access opening.

15. A dual closure butterfly valve as recited in claim 14, wherein:

said access opening is oriented to permit installation and removal of said closure elements in the open position thereof.

16. A dual closure butterfly valve as recited in claim 13, wherein said slip joint connection comprises:

a first joint sealing portion at one extremity of said seat segment with said valve body, said first joint sealing portion defining an inwardly facing sealing surface; and a second joint sealing portion at the opposite extremity of said seat segment and being in spaced relation with said valve body, said second joint sealing portion defining an outwardly facing sealing surface adapted for sealing engagement with the inwardly facing sealing surface of an adjacent seat segment.

17. A dual closure butterfly valve as recited in claim 16, wherein:

said first and second joint sealing portions define a lapped joint; and retainer means securing said second joint sealing portions of each of said seat segments in relation with said valve body and said second joint sealing portions overlapping said first joint sealing portions and retaining the same positoned tightly in engagement with said valve body.

18. A dual closure butterfly valve as recited in claim 13, wherein:

spaced abutment means is defined within said valve body defining said circular seat groove therebetween, said seat segments being positioned at least partially within said annular seat groove.

19. A dual closure butterfly valve as recited in claim 13, wherein:

a first annular abutment is defined within said valve body;

a second annular abutment is defined within said valve body on the upstream side of said first annular abutment and being in spaced relation with said first annular abutment and defining said seat groove therebetween; and said seat segments being at least partially received within said seat groove.

20. A dual closure butterfly valve as recited in claim 19, wherein:

said first annular abutment is of large dimension and defines a supporting surface supporting substantially the entire downstream surfaces of said seat segments; and said second annular abutment is of smaller dimension as compared to said first annular abutment and supports the radially outer portions of said seat segments and exposes the radially inner portions of said seat segments for contact by said closure elements.

21. A dual closure butterfly valve as recited in claim 20, wherein:

said first and second annular abutments are defined by rings having outer peripheral portions dimensioned for fitting relation with the inner surface of said valve body; and weld means secures said first and second abutment means in assembly with said valve body.

22. A dual closure butterfly valve as recited in claim 13, wherein said closure support means comprises:

a structural support element extending transversely across said flow passage and having the end portions thereof supported by said valve body;

shaft support means being defined on opposed sides of said structural support and being positioned in substantially parallel relation with one another; and a pair of closure support shafts being received by said closure support means and being pivotally interconnected with respective ones of said closure shaft support means and non-pivotally connected with said closure elements.

23. A dual closure butterfly valve as recited in claim 22, where:

the structural support element may be removably assembled with said valve body;

the shaft support means the support shafts and the closure elements being in assembled relationship with the structural support element.

24. The invention of claim 23 wherein the structural support element with assembled parts may be removed and installed through a transverse opening of smaller dimension as compared to the diameter defined by said closure elements when in the closed position;

the assembly being removed while in the open position.

25. A butterfly valve mechanism as recited in claim 13 wherein said actuating means comprise: valve stems removably connected with each of said closure elements so as to cause the respective closure element to rotate with the valve stem when both are in operating position; such that the valve stem may be disconnected with the closure element by axial movement of the valve stem.

* * * * *